United States Patent
Zhou et al.

(10) Patent No.: US 12,553,925 B2
(45) Date of Patent: Feb. 17, 2026

(54) DATA PROCESSING CIRCUIT AND THE METHOD THEREOF

(71) Applicant: Chengdu Monolithic Power Systems Co., Ltd., Chengdu (CN)

(72) Inventors: Yong Zhou, Chengdu (CN); Chengjiang Huang, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 244 days.

(21) Appl. No.: 18/451,301

(22) Filed: Aug. 17, 2023

(65) Prior Publication Data
US 2024/0110957 A1    Apr. 4, 2024

(30) Foreign Application Priority Data
Sep. 26, 2022    (CN) .......................... 202211179116.7

(51) Int. Cl.
*G01R 19/25*    (2006.01)

(52) U.S. Cl.
CPC ................ *G01R 19/2506* (2013.01)

(58) Field of Classification Search
None
See application file for complete search history.

(56) References Cited

U.S. PATENT DOCUMENTS

| | | |
|---|---|---|
| 8,803,719 B2 | 8/2014 | Li et al. |
| 9,882,482 B1 * | 1/2018 | Hendry ................ H02M 3/158 |
| 10,651,738 B2 | 5/2020 | Gong et al. |

* cited by examiner

*Primary Examiner* — Farhana A Hoque
(74) *Attorney, Agent, or Firm* — Perkins Coie LLP

(57) ABSTRACT

A multi-channel detecting circuit including a priority-setting circuit and an ADC (analog-to-digital converting) circuit is provided. The priority-setting circuit receives a plurality of sampled signals and a set signal, and provides the plurality of sampled signals at different output frequencies determined by the set signal. The ADC circuit receives the plurality of sampled signals, and respectively converts the plurality of sampled signals to a plurality of digital signals one by one.

18 Claims, 3 Drawing Sheets ately converts the plurality of sampled signals to the plurality of digital signals one by one.

According to an embodiment of the present invention, a data processing method is provided. The data processing method includes several main steps. (I) Determining output frequencies of each one of a plurality of sampled signals based on a set signal. (II) Providing each one of the plurality of sampled signals at the output frequency of the said sampled signal. (III) Converting the plurality of sampled signals respectively to a plurality of digital signals in sequence.

DATA PROCESSING CIRCUIT AND THE METHOD THEREOF

CROSS-REFERENCE TO RELATED APPLICATIONS

This application claims priority to and the benefit of Chinese Patent Application No. 202211179116.7, filed on Sep. 26, 2022, which is incorporated herein by reference in its entirety.

TECHNICAL FIELD

The present invention relates generally to electronic circuits, and more particularly but not exclusively to data processing circuits.

BACKGROUND OF THE INVENTION

Multi-channel detecting circuits are widely used to detect analog parameters of switching power supplies. An analog-to-digital converter converts the detected analog parameters to digital signals one by one for further processing. In some applications, a faster data updating rate is required in some important channels of the multi-channel detecting circuits used with the switching power supplies. When the converting speed of the post-stage analog-to-digital converter is fixed, one conventional method to increase the data updating rate is to use more analog-to-digital converters, which results in higher cost.

Therefore, a data processing circuit for improving the data processing efficiency of the multi-channel detecting circuit at no additional cost is needed.

SUMMARY OF THE INVENTION

The present invention provides a data processing circuit to assign different output frequencies to sampled signals provided by a multi-channel sampling circuit, thus to make sure data from the important channel(s) could be updated timely in the condition of a single ADC (analog-to-digital converting) circuit configured to process all the data from multiple channels.

According to an embodiment of the present invention, a multi-channel detecting circuit is provided. The multi-channel detecting circuit includes a priority-setting circuit and an ADC (analog-to-digital converting) circuit. The priority-setting circuit receives a plurality of sampled signals and a set signal, and provides the plurality of sampled signals at different output frequencies determined by the set signal. The ADC circuit receives the plurality of sampled signals, and respectively converts the plurality of sampled signals to a plurality of digital signals one by one.

According to an embodiment of the present invention, a data processing circuit is provided. The data processing circuit includes a multi-channel detecting circuit and an indicating circuit. The multi-channel detecting circuit receives a plurality of sampled signals, and provides a plurality of digital signals. The indicating circuit receives the plurality of digital signals, and provides a plurality of indicating signals. The multi-channel detecting circuit includes a priority-setting circuit and an ADC (analog-to-digital converting) circuit. The priority-setting circuit receives the plurality of sampled signals and a set signal, and provides the plurality of sampled signals at different output frequencies determined by the set signal. The ADC circuit

BRIEF DESCRIPTION OF THE DRAWINGS

The present invention can be further understood with reference to the following detailed description and the appended drawings.

DETAILED DESCRIPTION

Figure 1:
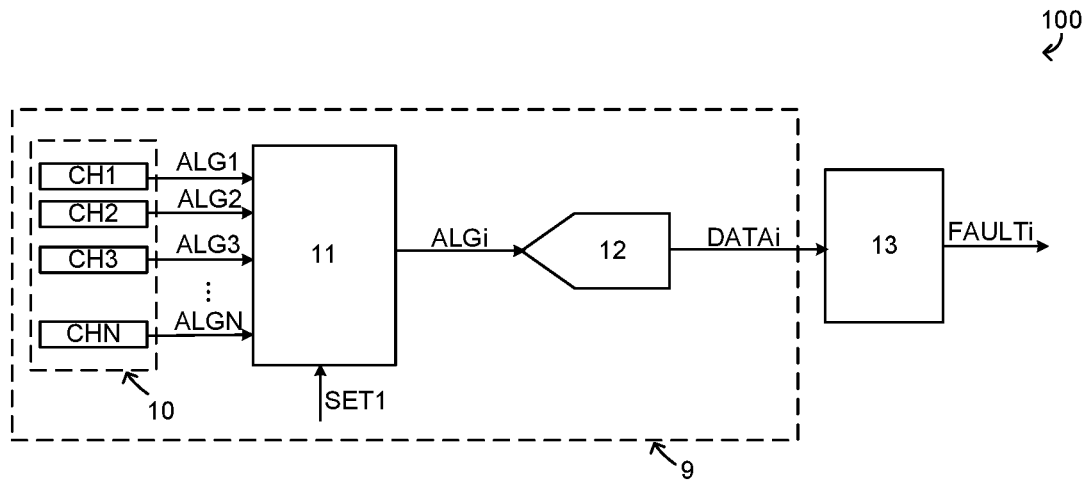
FIG. 1 schematically shows a data processing circuit 100 in accordance with an embodiment of the present invention.

Various embodiments of the present invention will be described in detail below, and it should be noted that the embodiments described here are only for illustration. However, the present invention is not limited thereto. In the following description, numerous specific details, such as example circuits and example values for these circuit components, and methods are illustrated in order to provide a thorough understanding of the present invention. It will be apparent for persons having ordinary skill in the art that the present invention can be practiced without one or more specific details, or with other methods, components, materials. In other instances, well-known circuits, materials or methods are not shown or described in detail in order to avoid obscuring the present invention.

Throughout this description, the phrases "in one embodiment", "in an embodiment", "in some embodiments", "in an example", "in some examples", "in one implementation", and "in some implementations" as used to include both combinations and sub-combinations of various features described herein as well as variations and modifications thereof. These phrases used herein does not necessarily refer to the same embodiment, although it may. Additionally, persons having ordinary skill in the art will understand that the drawings provided herein are for illustrative purposes and are not necessarily drawn to scale. The similar elements are provided with similar reference numerals. As used herein, the term "and/or" includes any combinations of one or more of the listed items.

FIG. 1 schematically shows a data processing circuit 100 in accordance with an embodiment of the present invention. As shown in FIG. 1, the data processing circuit 100 includes a multi-channel detecting circuit 9 and an indicating circuit 13. The multi-channel detecting circuit 9 includes a multi-channel sampling circuit 10, a priority-setting circuit 11, and an ADC (analog-to-digital converting) circuit 12. The multi-channel sampling circuit 10 includes N sampling circuits CH1-CHN, wherein N is a natural number greater than 1 (e.g., N=16). The N sampling circuits CH1-CHN respectively provide N sampled signals ALG1-ALGN. In the embodiment of FIG. 1, the i'th sampled signal ALGi, i.e., any one of the N sampled signals ALG1-ALGN, may be a current/voltage signal, wherein $1 \leq i \leq N$. The priority-setting circuit 11 receives the N sampled signals ALG1-ALGN and a set signal SET1, and respectively sets each of the N sampled signals ALG1-ALGN to different data updating priorities, e.g., a first data updating priority, a second data updating priority, etc., based on the set signal SET1. The N sampled signals ALG1-ALGN are provided by the priority-setting circuit 11 according to different data updating priorities. The update times of the i'th sampled signal ALGi provided from the priority-setting circuit 11 per unit time is also defined as the output frequency of the i'th sampled signal ALGi in accordance with an embodiment of the present invention. Different data updating priorities correspond to different output frequencies. In other words, the data updating priorities of the sampled signals indicates the output frequencies of the sampled signals. In one embodiment, the output frequency of the sampled signal ALGi having the first data updating priority is set to be higher than the output frequency of the sampled signal ALGj having the second data updating priority, wherein $1 \leq j \leq N$, and $i \neq j$. That is to say, the sampled signal with the first data updating priority has a higher output frequency than the sampled signal with the second data updating priority, and is updated more times per unit time. The set signal SET1 having output frequency information of each one of the N sampled signals ALG1-ALGN is provided to the priority-setting circuit 11 based on controlling and sampling requirements. For example, if the first sampled signal ALG1 (e.g., input current signal) and the second sampled signal ALG2 (e.g., input voltage signal) are critical to maintain the circuit operation, and the rest sampled signals are less important, then the sampled signals ALG1-ALG2 could be set to the first data updating priority with the higher output frequency and the rest sampled signals could be set to the second data updating priority with the lower output frequency. Thus the first sampled signal ALG1 and the second sampled signal ALG2 could be updated timely to make sure the circuit operate normally. In one embodiment, the output frequency information includes different output frequency ratios of the sampled signal ALGi having the first data updating priority to the sampled signal ALGj having the second data updating priority, wherein $1 \leq j \leq N$, and $i \neq j$ (e.g., 7:1 or 10:3). In one embodiment, an external control circuit provides the set signal SET1 via a digital interface. In one embodiment, the output frequency of the sampled signals having the second data updating priority is set to zero, which means the sampled signals having the second data updating priority is not provided, i.e., blocked by the priority-setting circuit 11. In one embodiment, some of the N sampled signals ALG1-ALGN are current signals and the rest are voltage signals.

The ADC circuit 12 respectively converts the N sampled signals ALG1-ALGN to N digital signals DATA1-DATAN one by one, i.e., the ADC circuit 12 receives the i'th sampled signal ALGi provided by the priority-setting circuit 11, and converts the i'th sampled signal ALGi to a digital signal DATAi. The indicating circuit 13 receives the digital signal DATAi provided by the multi-channel detecting circuit 9, and provides an indicating signal FAULTi based on the digital signal DATAi.

Figure 2:
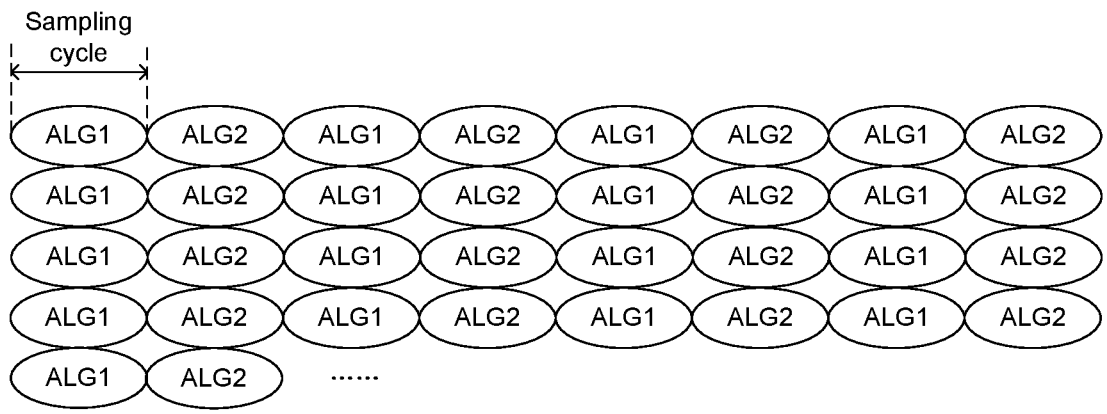
FIG. 2 schematically shows a sequence diagram of 16-channel sampled signals provided by a priority-setting circuit in accordance with an embodiment of the present invention.

FIG. 2 schematically shows a sequence diagram of 16-channel sampled signals provided by a priority-setting circuit in accordance with an embodiment of the present invention. A sampling cycle refers to the time period updating/refreshing the data of one channel. In a 16-channel sampling circuit, data of each channel is updated every 16 sampling cycles if all channels have the same data updating priority. In the example of FIG. 2, a first sampled signal ALG1 and a second sampled signal ALG2 are set to the first data updating priority, and the sampled signals ALG3-ALG16 are set to the second data updating priority, meanwhile the output frequency of the sampled signals ALG3-ALG16 having the second data updating priority is set to zero. In other words, the sampled signals ALG3-ALG16 are not outputted. As a result, the sampled signals ALG1 and ALG2 are updated every 2 sampling cycles, which means the data updating rate of the sampled signals ALG1 and ALG2 is higher than the data updating rate of the rest sampled signals.

Figure 3:
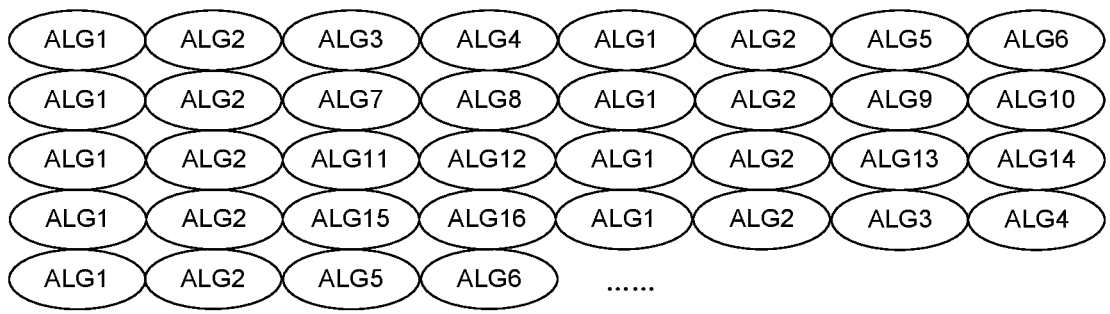
FIG. 3 schematically shows a sequence diagram of 16-channel sampled signals provided by a priority-setting circuit in accordance with another embodiment of the present invention.

FIG. 3 schematically shows a sequence diagram of 16-channel sampled signals provided by a priority-setting circuit in accordance with another embodiment of the present invention. In the embodiment as shown in FIG. 3, the first sampled signal ALG1 and the second sampled signal ALG2 are set to the first data updating priority, and the sampled signals ALG3-ALG16 are set to the second data updating priority. Compared with the embodiment as shown in FIG. 2, in the embodiment in FIG. 3, the ratio of the output frequency of the sampled signals ALG1-ALG2 (with the first data updating priority) to the output frequency of sampled signals ALG3-ALG16 (with the second data updating priority) is set to 7:1. As shown in FIG. 3, the sampled signals ALG1-ALG2 having the first data updating priority are updated every 4 sampling cycles, while the sampled signals ALG3-ALG16 having the second data updating priority are updated every 28 sampling cycles.

Figure 4:
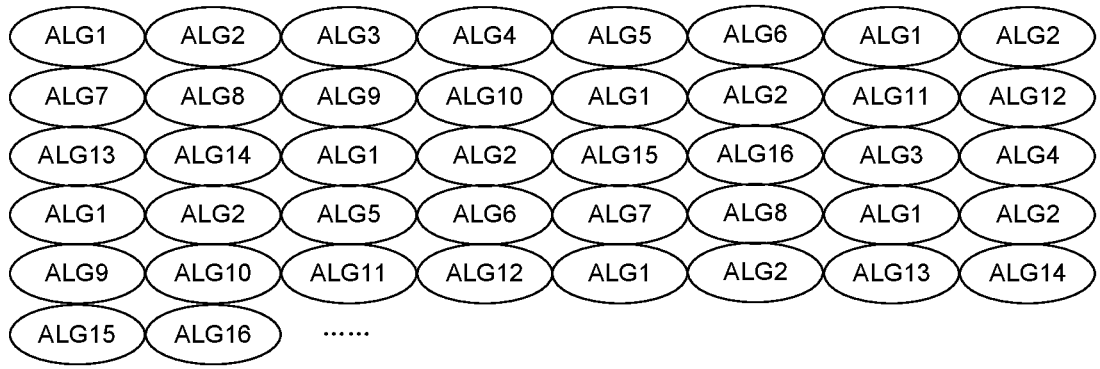
FIG. 4 schematically shows a sequence diagram of 16-channel sampled signals provided by a priority-setting circuit in accordance with yet another embodiment of the present invention.

FIG. 4 schematically shows a sequence diagram of 16-channel sampled signals provided by a priority-setting circuit in accordance with yet another embodiment of the present invention. In the embodiment as shown in FIG. 4, the first sampled signal ALG1 and the second sampled signal ALG2 are set to the first data updating priority, and the sampled signals ALG3-ALG16 are set to the second data updating priority. Compared with the embodiments as shown in FIG. 2 and FIG. 3, in the embodiment of FIG. 4, the ratio of output frequency of the sampled signals ALG1-ALG2 (with the first data updating priority) to the output frequency of the sampled signals ALG3-ALG16 (with the second data updating priority) is set to 10:3. As shown in FIG. 4, the sampled signals ALG1 and ALG2 are updated every 6 sampling cycles, while the sampled signals ALG3-ALG16 having the second data updating priority are updated every 20 sampling cycles.

Figure 5:
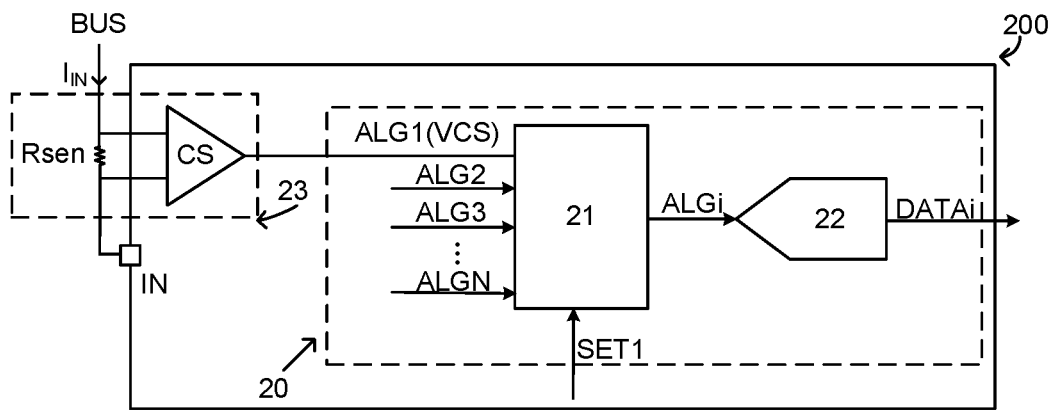
FIG. 5 schematically shows a switching power supply 200 with a multi-channel detecting circuit 20 in accordance with an embodiment of the present invention.

FIG. 5 schematically shows a switching power supply 200 with a multi-channel detecting circuit 20 in accordance with an embodiment of the present invention. The switching power supply 200 may have any suitable topology, like a buck topology, a boost topology or a buck-boost topology. In the embodiment as shown in FIG. 5, the switching power supply 200 includes an input terminal IN coupled to a bus power supply BUS. A sampling circuit 23 is coupled to the bus power supply BUS and the input terminal IN, to detect an input current $I_{IN}$ flowing through the input terminal IN and to provide a detecting signal VCS based on the input current $I_{IN}$. In one embodiment, the detecting signal VCS is provided to a priority-setting circuit 21 as the first sampled signal ALG1. In the embodiment as shown in FIG. 5, the sampling circuit 23 includes a sampling resistor Rsen and an error amplifier CS. The sampling resistor Rsen is a discrete device in FIG. 5. In another embodiment, the sampling resistor Rsen may be integrated to the switching power supply 200. In one embodiment, the gain of the error amplifier CS is user-customizable, which means users could adjust the gain of the error amplifier CS via external settings. In some embodiments, the switching power supply 200 has a digital interface to receive the external setting. The multi-channel detecting circuit 20 receives various parameters of the switching power supply 200 (e.g., input voltage, output voltage, and output current), and provides corresponding digital signals. The multi-channel detecting circuit 20 includes a priority-setting circuit 21 and an ADC circuit 22. The priority-setting circuit 21 receives the N sampled signals ALG1-ALGN and the set signal SET1, and provides the sampled signals in sequence with different data updating priorities determined by the set signal SET1. The output frequency of the sampled signals having the first data updating priority is set to be higher than the output frequency of the sampled signals having the second data updating priority. The ADC circuit 22 receives each one of the sampled signals ALG1-ALGN from the priority-setting circuit 21, and respectively converts the sampled signals ALG1-ALGN to the digital signals DATA1-DATAN one by one. For example, the sampled signal ALGi is converted to the digital signal DATAi, and the sampled signal ALGj is converted to the digital signal DATAj.

Figure 6:
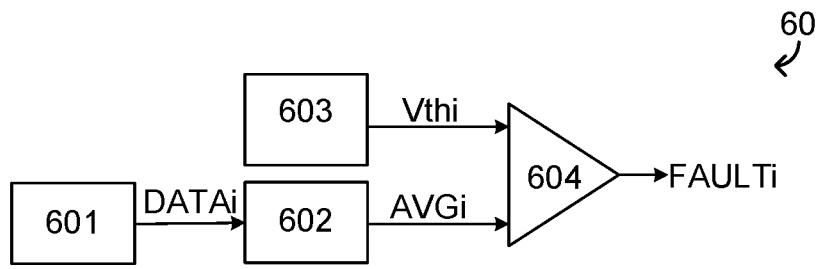
FIG. 6 schematically shows an indicating circuit 60 in accordance with an embodiment of the present invention.

FIG. 6 schematically shows an indicating circuit 60 in accordance with an embodiment of the present invention. In FIG. 6, the indicating circuit 60 includes an averaging circuit 602 and a comparing circuit 604. The averaging circuit 602 receives the digital signal DATAi, and generates an averaging signal AVGi based on the digital signal DATAi, according to an averaging equation. In one embodiment, the averaging equation could be expressed as:

$$AVGnew = \frac{AVGold \times (P-1) + DATAnew}{P},$$

wherein $DATA_{new}$ represents the updated value of the digital signal DATAi, $AVG_{old}$ represents the old value of the averaging signal AVGi, $AVG_{new}$ represents the updated value of the averaging signal AVGi, and P represents a user-customizable natural number, such as 6, 16. The comparing circuit 604 receives the averaging signal AVGi and a corresponding threshold signal Vthi, and provides the indicating signal FAULTi based on the averaging signal AVGi and the corresponding threshold signal Vthi, to indicate whether a certain event occurs. In one embodiment, when the averaging signal AVGi is greater than the threshold signal Vthi, the indicating signal FAULTi is in a first state for indicating the occurrence of the event. In some embodiments, the comparing circuit 604 includes a plurality of comparators, where each one of the plurality of comparators compares one of the averaging signals AVG1-AVGN with the corresponding one of the threshold signals Vth1-VthN. In the embodiment of FIG. 6, the indicating circuit 60 further includes a threshold setting circuit 603 to provide the threshold signal Vthi. The value of the threshold signal Vthi could be set by an external control circuit. In one embodiment, the indicating circuit 60 further includes a storage unit 601 for storing the digital signal DATAi provided by the ADC circuit.

Figure 7:
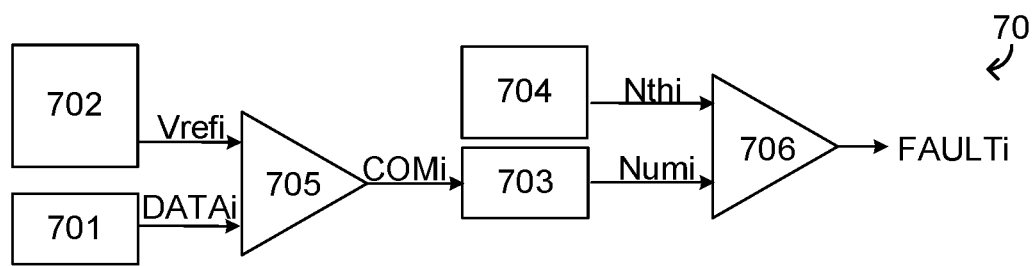
FIG. 7 schematically shows an indicating circuit 70 in accordance with another embodiment of the present invention.

FIG. 7 schematically shows an indicating circuit 70 in accordance with another embodiment of the present invention. In the embodiment as shown in FIG. 7, the indicating circuit 70 includes a first comparing circuit 705, a counting circuit 703, and a second comparing circuit 706. The first comparing circuit 705 receives the digital signal DATAi and a corresponding reference signal Vrefi, and provides a comparing signal COMi based on the corresponding reference signal Vrefi and the digital signal DATAi. The counting circuit 703 receives the comparing signal COMi, and provides a counting signal Numi. The value of the counting signal Numi increases every time when the digital signal DATAi increases to the reference signal Vrefi, and the value of the counting signal Numi decreases every time when the digital signal DATAi decreases to the reference signal Vrefi. In one embodiment, every time the digital signal DATAi is larger than the reference signal Vrefi, the value of the counting signal Numi increases by 1, and every time the digital signal DATAi decreases to the reference signal Vrefi, the value of the counting signal Numi decreases by 1. The second comparing circuit 706 receives the counting signal Numi and a corresponding threshold signal Nthi, and provides the indicating signal FAULTi based on the counting signal Numi and the corresponding threshold signal Nthi. In one embodiment, the indicating circuit 70 further includes a threshold setting circuit 704 to provide the threshold signal Nthi, and the value of the threshold signal Nthi is provided by an external control circuit. In one embodiment, the data processing circuit 70 further includes a storage unit 701 for storing the digital signal DATAi, which is provided by the ADC circuit.

As stated above, the data processing circuit for improving the data updating efficiency of the data from the multi-channel sampling circuit is provided. Based on system requirements, the sampled signals of channels are set to different data updating priorities by the priority-setting circuit. Higher data updating priority corresponds to higher output frequency and higher updating rate. Thus, when the converting speed and the number of the ADC circuits are fixed, the updating/refreshing rate of the important channels could be sped up through setting a higher data updating priority.

Although the invention has been described with reference to several exemplary embodiments, it should be understood that by persons skilled in the art that the present disclosure is not limited to what has been particularly shown and described herein above. Rather the scope of the present disclosure is defined by the claims and includes both combinations and sub-combinations of the various features described hereinabove as well as variations and modifications thereof which would occur to persons skilled in the art upon reading the foregoing description and which are not in the prior art.

What is claimed is:

1. A multi-channel detecting circuit, comprising:
    a multi-channel sampling circuit configured to provide a plurality of sampled signals based on a plurality of sampling results; and
    a priority-setting circuit configured to receive the plurality of sampled signals and a set signal, and to provide each one of the plurality of sampled signals with different update times per unit time based on the set signal; and an ADC (analog-to-digital converting) circuit configured to receive the plurality of sampled signals, and to respectively convert the plurality of sampled signals to a plurality of digital signals one by one.

2. The multi-channel detecting circuit of claim 1, wherein the plurality of sampled signals comprise current signals and voltage signals.

3. The multi-channel detecting circuit of claim 1, wherein the set signal comprises output frequency information of each one of the plurality of the sampled signals, and the priority-setting circuit receives the set signal and provides each one of the plurality of the sampled signals with different update times per unit time based on the set signal.

4. A data processing circuit, comprising:
a multi-channel detecting circuit configured to receive a plurality of sampled signals, and to provide a plurality of digital signals; and
an indicating circuit configured to receive the plurality of digital signals, and to provide a plurality of indicating signals;
wherein the multi-channel detecting circuit comprises:
a priority-setting circuit configured to receive the plurality of sampled signals and a set signal, and to provide the plurality of sampled signals at different output frequencies determined by the set signal; and
an ADC (analog-to-digital converting) circuit configured to receive the plurality of sampled signals, and to respectively convert the plurality of sampled signals to the plurality of digital signals one by one.

5. The data processing circuit of claim 4, wherein the multi-channel detecting circuit further comprises a multi-channel sampling circuit, configured to provide the plurality of sampled signals based on a plurality of corresponding sampling results.

6. The data processing circuit of claim 4, wherein the plurality of sampled signals comprise current signals and voltage signals.

7. The data processing circuit of claim 4, wherein the set signal comprises output frequency information of each one of the plurality of the sampled signals, and the priority-setting circuit receives the set signal and provides each one of the plurality of the sampled signals with different update times per unit time based on the set signal.

8. The data processing circuit of claim 4, wherein the indicating circuit comprises:
an averaging circuit configured to receive the plurality of digital signals provided by the ADC circuit, and to provide a plurality of averaging signals, wherein each one of the plurality of averaging signals is provided based on a corresponding digital signal; and
a comparing circuit configured to receive the plurality of averaging signals and a plurality of threshold signals, and to provide the plurality of indicating signals, wherein each one of the plurality of indicating signals is provided based on a comparison result of a corresponding averaging signal and a corresponding threshold signal.

9. The data processing circuit of claim 8, wherein values of the plurality of threshold signals are user-customizable.

10. The data processing circuit of claim 8, wherein the indicating circuit further comprises a storage unit configured to store the plurality of digital signals provided by ADC circuit.

11. The data processing circuit of claim 4, wherein the indicating circuit comprises:

a first comparing circuit configured to receive the plurality of digital signals and a plurality of reference signals, and to provide a plurality of comparing signals, wherein each one of the plurality of comparing signals is provided based on a comparison result of a corresponding digital signal and a corresponding reference signal;
a counting circuit configured to receive the plurality of comparing signals, and to provide a plurality of counting signals based on the plurality of comparing signals, wherein a value of each one of the plurality of counting signals increases every time when the corresponding digital signal increases to the corresponding reference signal, and decreases every time when the corresponding digital signal decreases to the corresponding reference signal; and
a second comparing circuit configured to receive the plurality of counting signals and a plurality of threshold signals, and to provide a plurality of indicating signals, wherein each one of the plurality of indicating signals is provided based on a comparison result of the corresponding counting signal and a corresponding threshold signal.

12. The data processing circuit of claim 11, wherein values of the plurality of reference signals and values of the plurality of threshold signals are user-customizable.

13. The data processing circuit of claim 11, wherein the indicating circuit further comprises a storage unit configured to store the plurality of digital signals provided by ADC circuit.

14. A data processing method, comprising:
determining output frequencies of each one of a plurality of sampled signals based on a set signal; wherein the plurality of sampled signals are provided by a multi-channel sampling circuit based on a plurality of sampling results; and wherein the set signal comprises output frequency information of each one of the plurality of the sampled signals;
providing each one of the plurality of sampled signals with different update times per unit time based on the set signal; and
converting the plurality of sampled signals respectively to a plurality of digital signals in sequence.

15. The data processing method of claim 14, further comprising:
providing a plurality of averaging signals based on the plurality of digital signals, wherein each one of the plurality of averaging signals is provided based on a corresponding digital signal; and
providing a plurality of indicating signals based on the plurality of averaging signals and a plurality of threshold signals, wherein each one of the plurality of indicating signals is provided based on a comparison result of a corresponding averaging signal and a corresponding threshold signal.

16. The data processing method of claim 15, wherein values of the plurality of threshold signals are user-customizable.

17. The data processing method of claim 14, further comprising:
providing a plurality of comparing signals based on the plurality of digital signals and a plurality of reference signals, wherein each one of the plurality of comparing signals is provided based on a comparison result of a corresponding digital signal and a corresponding reference signal;

providing a plurality of counting signals based on the plurality of comparing signals, wherein a value of each one of the plurality of counting signals increases every time when the corresponding digital signal increases to the corresponding reference signal, and decreases every time when the corresponding digital signal decreases to the corresponding reference signal; and providing the plurality of indicating signals based on the plurality of counting signals and a plurality of threshold signals, wherein each one of the plurality of indicating signals is provided based on a comparison result of a corresponding counting signal and a corresponding threshold signal.

18. The data processing method of claim 17, wherein values of the plurality of reference signals and values of the plurality of threshold signals are user-customizable.

* * * * *